2,912,397

VINYL RESIN AND CLAY COMPOSITION STABILIZED WITH LEAD AND EPOXY COMPOUNDS

Vladimir J. Houska, Bound Brook, and Robert J. Lurie, Plainfield, N.J.

No Drawing. Application October 20, 1955
Serial No. 541,844

9 Claims. (Cl. 260—23)

This invention relates to compositions suitable for use as electrical insulation material, and more especially to those insulating compositions which have as their base a chlorine-containing vinyl resin.

Chlorine-containing vinyl resins have found favor as dielectric insulating materials. Such vinyl resins have themselves good electrical characteristics and are substantially unaffected by moisture, oil, acids and alkali. Plasticizers are employed in order to render the compositions flexible so that when they are applied to wires, cables and the like they can be bent and pulled around angles, conduits, etc. Other materials are added in comparatively minor quantities, e.g., so-called stabilizers, which serve to retard the chemical decomposition caused by the splitting out of hydrogen chloride from the vinyl resin when it is subjected to severe heating. Lubricants such as mineral oil are often included and the composition may be colored if desired by the addition of pigments, dyes and the like. Fillers, for instance, barytes, whiting, clay and fuller's earth, may also be added.

A preferred filler for vinyl resin compositions which are intended for use in connection with electrical insulation is clay. It has been found that the use of clay in such compositions improves the electrical resistivity of the composition and renders it more scratch- and crease-resistant when the composition is applied to wire, cable and the like than is the case with compositions containing such mineral fillers as whiting.

The bulk of the clay used as a filler in vinyl resin compositions is the so-called dry process or unbleached clay produced by the dry grinding air flotation process. In this process, the crude clay is first dried to a moisture content of approximately 1%, then fed to a roller mill where it is ground to a fineness of about 100% through a 325 mesh screen. The fine clay particles are lifted from the bed of the grinder by air into a cyclone separator where they settle and flow by gravity into storage bins. These pulverized unbleached clays, when shaken with water and then allowed to settle, show an acid reaction, e.g., the dry ground natural clays occurring in South Carolina and Georgia range in pH from about 4.40 to 6.0. The unbleached clays are sometimes further purified by calcination, e.g. heating to about 400–600° C. This gives a clay of somewhat improved color.

The good qualities imparted by clay to vinyl resin compositions are offset, however, by the intolerable amount of color and variability in color developed in processing compositions in which clay is a filler. This variation in color is particularly noticeable in those electrical insulation compositions wherein clay is used in conjunction with lead stabilizers whose use is desirable since they do not detract from the electrical properties of the composition. This excessive color development in clay-filled compositions is apparently associated with the acidity of the clay since the addition of basic materials, e.g. sodium stearate, improves the color of a clay-filled compound. The substitution of more alkaline stabilizers, e.g., cadmium stearate, for the lead stabilizers also tends to minimize the production of color. However, such substances, while they serve to improve the color, degrade the electrical properties, and consequently their use is undesirable.

The acidic nature of unbleached clays also tends to decompose the plasticizers included in the vinyl composition and, as a result, the copper conductors are corroded by the acidic constituents released by the decomposition of the plasticizers. This is particularly true of the polyester type of plasticizer, such as the linear polyesters of glycols and dibasic acids, e.g. polyethylene glycol sebacate.

A considerable amount of work has been done in attempting to purify the clays by various methods of washing to remove undesirable salts by wet processing the clays. In this latter method the crude clays are mixed with water and vigorously agitated until the individual clay particles are separated from each other and individually suspended in water. The clay water suspension is next hydraulically classified, e.g. by a continuous centrifugal process and the slurry is decolorized by chemical bleaching with sodium hydrosulfite ($Na_2S_2O_4$). The bleaching process reflocculates the suspension, from which the clay particles are separated by settling followed by filtration. The filtered clay is then dried to a moisture content of 1%, then ground and air floated as described for the dry grinding air flotation process. Clays so treated usually show a pH of 7.00 or over.

While such methods are partially effective for improving the color of clays, they add considerably to the cost of the clays, and, consequently, to the cost of the insulating compositions containing them. In addition, the use of bleached clays in vinyl compositions, although it results in compositions of better color and greater stability of color, i.e. the color does not change appreciably during processing, is disadvantageous as the resulting compositions have significantly poorer electrical resistivity than similar compositions in which unbleached clays are employed as fillers. This could be due, in part, to the alkaline character of these bleached clays, i.e. neutralization of a clay may reduce its efficiency as a direct current resistivity booster.

We are aware that numerous suggestions have been made to render chlorine-containing vinyl resin compositions stable to light and heat. Indeed, many patents have been granted covering a number of these suggestions. However, we have been unable to find any known method of making chlorine-containing vinyl resin compositions which utilize the desirable properties of unbleached clay and lead compounds without at the same time exhibiting certain undesirable properties which characterize the conjoint use of such clay and lead compounds in such compositions. In this connection, the use of clay fillers, in particular, unbleached clay, in combination with lead stabilizers in chlorine-containing vinyl resin compositions has been found to be disadvantageous as the lead stabilizers intensify the dark color imparted by the clay to such compositions.

Accordingly, it is an object of this invention to provide light-colored electrical insulation compositions having as their base a chlorine-containing vinyl resin stabilized with a lead stabilizer and containing clay, including ordinary dry process clay, as a filler.

Another object is to provide such compositions which are light-colored and which retain their light color when processed at temperatures between 130–160° C. for a period of time from 10–20 minutes and then milled for 10 minutes at a temperature of 170° C.

A further object of our present invention is to provide such compositions which possess electrical properties as measured by direct current resistivity of at least $1.0 \times 10^5$ megohm-cm. at 50° C.

Other objects of the invention will become apparent from the following description.

The foregoing objects have been attained in accordance with this invention by using in admixture with chlorine-containing vinyl resins, lead stabilizer and clay filler, a fourth ingredient, namely, an epoxidized unsaturated fatty acid or ester, e.g., epoxidized soybean oil and epoxidized oleic and linoleic acids or their esters. These epoxidized acids or esters are readily prepared by reacting the unsaturated fatty acids or esters with peracetic acid or with mixtures of acetic acid and hydrogen peroxide. Their preparation and isolation are known and are described, for example, in U.S.P. 2,567,930 and U.S.P. 2,485,160.

In addition, it has unexpectedly been found that compositions made in accordance with our present invention are non-corrosive to the copper conductors around which they are used. The non-staining characteristics of the compositions of this invention were especially surprising with regard to such compositions which contain unbleached clay and which are plasticized with polyesters such as polyethylene glycol sebacate, polypropylene glycol sebacate or polypropylene gylcol adipate. In this connection, it is known that the acidic nature of such clays causes the decompositions of such plasticizers, with resultant corrosion of the conductor.

Examples of chlorine-containing vinyl resins which can be used in accordance with our present invention include polyvinyl chloride and the co-polymers of vinyl chloride and vinyl acetate containing about 95% or more of vinyl chloride.

The clays employed are preferably the unbleached clays, i.e., the dry processed clays, either uncalcined or calcined.

Lead stabilizers in general can be employed in accordance with our present invention. Indicative of this general applicability of lead stabilizers, in particular those which are acid acceptors, is the following enumeration of such stabilizers which are useful for our purposes:

Simple and mixed inorganic salts such as lead carbonate, lead orthosilicate or preferably coprecipitated lead orthosilicate and silica gel, basic lead silicate, tribasic lead sulfate, dibasic lead phosphite, white lead (mixture of the carbonate and hydroxide), etc.; salts of organic acids such as lead stearate, dibasic lead stearate, lead maleate, lead fumarate, lead tartrate, lead salicylate, dibasic lead phthalate, basic lead hydroxynaphthenate, lead palmitate, lead laurate, lead abietate and the like; and commercial mixtures of neutral and basic salts such as are prepared by fusing together lead oxide and a suitable organic acid such as stearic, salicylic, etc.

It will be appreciated by those skilled in the resin art that the lead stabilizers metioned above—and others which may also be employed—are not all of equal usefulness, some being better than others, by reason of their ability to impart to vinyl resins superior resistance to discoloration, etc.

Epoxidized unsaturated fatty acids and esters, including animal, marine and vegetable oils, are useful in accordance with our present invention. The unsaturated fatty acids contain from about 8 to 22 carbon atoms. The unsaturated fatty acid esters include the aliphatic, cycloaliphatic, aryl and aralkyl esters of 8–22 carbon atom unsaturated fatty acids. The fatty acid group in such esters may be derived from animal, vegetable, or marine oils containing unsaturated fatty acid groups; or they may be derived from the mixed fatty acids contained in such oils; or, if desired, they may be derived from isolated unsaturated fatty acids.

The epoxidized fatty acid esters and oils may possess alcohol groups of wide variety. These alcohol groups include those derived from alcohols having a hydrocarbon group attached to the hydroxyl group and include particularly mono-hydric aliphatic alcohols such as methyl, ethyl, propyl, butyl alcohols and the like; polhydric alcohols such as the glycols, diethylene glycol and the like; glycerols and polyglycerols. Also useful herein are epoxidized esters having alcohol groups derived from aromatic alcohols such as phenol; aralkyl alcohols such as benzyl alcohol; and cycloaliphatic alchols such as cyclohexanol.

The compositions of this invention are ordinarily prepared by mixing the ingredients together in a heated mixer, such as a Banbury mixer. There is usually added from about 5 to 40 parts of clay for every 100 parts of vinyl resin, the smaller amounts of clay being used for the tougher, more flexible types of insulation, while the larger amounts of clay are employed where a stiffer and more rigid type of insulation is desired. The lead stabilizer is employed in amounts from about 2 to 10 parts, and a lubricant, such as stearic acid, mineral oil, mineral or vegetable waxes, may be added up to about 3 parts. The epoxidized component is used in amounts of from about 3 to 40 parts, on the same basis, i.e., for 100 parts of vinyl resin, by weight.

If desired, other plasticizers, such as tricresyl phosphate or di-2-ethyl hexyl phthalate, or the so-called resinous plasticizers such as the linear polyesters of glycols and dibasic acids, e.g. polyethylene glycol sebacate, are added such that the combined amount of the epoxy compound, such as epoxidized vegetable oil, and plasticizer is present to the extent of about 25 to 100 parts per 100 parts of vinyl resin. In addition to these ingredients, coloring materials may be added in the form of pigments or dyes. All of the parts given above, as well as hereinafter, are by weight.

In general, in preparing the herein-described compositions, the ingredients are mixed in a kneader for about 10–20 minutes at 130–160° C. to a homogeneous plastic mass, which is then transferred to milling rolls and milled for about 10 minutes at 170° C. to a uniform sheet which can then be cut into strips or diced, in which form it can be fed to an extruder for application to electrical conductors.

The compositions prepared according to this invention using ordinary unbleached air floated or calcined clay will vary in color from a very light gray to a light cream color, whereas compositions not prepared in accordance with this invention will be non-uniform in color and vary from gray to brown to tan. The present compositions are particularly suitable for light-colored electrical insulation compositions. It has also been discovered that these compositions have no corrosive effect on electrical conductors. This is evidenced by the fact that copper conductors insulated with these compositions are not discolored even after being heated for 7 to 10 days at 100° C. On the other hand, compositions prepared without an epoxidized fatty acid or ester were stained green when aged in a similar manner.

The following examples are illustrative of the invention. The parts given are by weight and the direct current resistivity is in megohm/cm. at 50° C.

The "polyvinyl chloride resin" referred to in the following examples is a homopolymer of vinyl chloride having a specific viscosity of 0.20 (measured at 20° C. on a solution containing 0.2 g. resin per 100 ml. of nitrobenzene; i.e., specific viscosity=$(n/n_0)-1$, where $n_0$ and $n$ are the viscosities at 20° C., respectively, of nitrobenzene and of a solution containing 0.2 g. resin/100 ml. nitrobenzene).

The "epoxidized vegetable oil" referred to in the examples is epoxidized soybean oil, marketed by Rohm and Haas, Philadelphia, Pennsylvania, as Paraplex G–62, and having a refractive index (20° C.) of 1.4746, specific gravity (20° C./20° C.) of 0.996, viscosity (20° C.) of 870 cps., iodine number (Wijs method) of 4, saponification number of 180, and containing 6.4% (by weight) of epoxy oxygen.

*Example I*

(a) One hundred parts of polyvinyl chloride resin, 43 parts of dioctyl phthalate, 5 parts of epoxidized vegetable oil, 3 parts of lead ortho silicate, 0.5 parts of stearic acid, 1.0 part of titanium dioxide, and 40 parts of unbleached clay were mixed in a Banbury mixer for about 10 minutes at a temperature of about 150° C. The mixture was then transferred to milling rolls and milled at 170° C. for 10 minutes. The resulting product remained light gray in color. The direct current resistivity was $178 \times 10^5$.

(b) A composition similar to that described in (a) was prepared but using 48 parts dioctyl phthalate and no epoxidized vegetable oil. The other ingredients were the same. This composition when mixed and milled as in (a) changed to a very dark gray in color. The direct current resistivity was $19 \times 10^5$.

Example II (a) 100 parts of polyvinyl chloride resin, 21.4 parts of a polyester plasticizer having a molecular weight of about 2000, a specific gravity (20° C.) of 1.084, refractive index (20° C.) of 1.470 and viscosity (20° C.) of 3000 cps. marketed by Rohm and Haas as Paraplex G-50, 10.7 parts of n-octyl n-decyl phthalate (Hercoflex-150), 10.7 parts of epoxidized vegetable oil, 5.4 parts of dibasic lead phthalate, 0.45 part of dibasic lead stearate, 1.8 parts of mineral oil, 3.6 parts of antimony trioxide, 9.1 parts of unbleached clay, and 18.1 parts of calcium carbonate were compounded in the manner described in Example I. After milling the composition for 10 minutes at 170° C. it was still a light cream color and had a direct current resistivity of $40 \times 10^5$.

A copper stain test was carried out in the following manner:

The test composition was extruded onto a copper conductor and a length of the insulated conductor oven-aged for from 7 to 10 days at 100° C. and then an additional 7 to 10 days at 120° C. The insulation was then stripped off the copper conductor. In a positive test the insulation was stained a greenish brown color. No color at all was apparent in a negative test.

The composition of this example gave a negative copper staining test result.

(b) A composition was prepared similar to that described in (a) of this example but subsituting 10.7 parts of polyester plasticizer (Paraplex G-50) for the epoxidized vegetable oil. This composition was tan colored after milling for 10 minutes at 170° C. The copper stain test was positive. The direct current resistivity was $10 \times 10^5$.

Example III (a) 100 parts of polyvinyl chloride resin, 43.7 parts of polyester plasticizer, namely, propylene glycol sebacate, the condensation product of 1,2 propylene glycol and sebacic acid, having an average molecular weight of about 8000, specific gravity (25° C.) of 1.06, refractive index (25° C.) of 1.470 and viscosity (25° C.) of about 170,000 cps., marketed by Rohm and Haas as Paraplex G-25, 17.6 parts of epoxidized vegetable oil, 5.3 parts of dibasic lead phosphite, 0.44 part of dibasic lead stearate, and 8.8 parts of unbleached clay were compounded as described for Example I. After milling the composition for 10 minutes at 170° C. it was still white in color. The direct current resistivity was $7 \times 10^5$ and copper stain test was negative.

(b) A composition similar to (a) of this example was prepared but the epoxidized vegetable oil was replaced with 17.6 parts of polyester plasticizer (Paraplex G-25). This composition became cream colored after being milled for 10 minutes at 170° C. The copper stain test was positive. The direct current resistivity was $2 \times 10^5$.

Example IV

A composition having the following ingredients in the specified amounts was prepared in accordance with the procedure of Example I:

100 parts of polyvinyl chloride
34 parts of polyester plasticizer (having a specific gravity (20° C.) of 1.1075, refractive index (20° C.) of 1.4690 and viscosity (20° C.) of 13,000 centipoises (marketed by Rohm and Haas as Paraplex G-53))
17.25 parts of epoxidized vegetable oil
5.17 parts of calcined clay (Burgess No. 30)
7.75 parts of calcium carbonate
0.43 parts of dibasic lead stearate
6.90 parts of dibasic lead phthalate
0.43 parts of 2,2-bis-(4-hydroxyphenyl) propane The resulting product was light in color, had desirable electrical resistance and gave a negative copper staining test result.

While we have described our invention in detail in its preferred embodiment, it will be obvious to those skilled in the art, after understanding our invention, that various changes and modifications may be made therein without departing from the spirit or scope thereof. We aim in the appended claims to cover all such modifications and changes.

We claim:

1. A composition suitable for use as electrical insulation material, said composition comprising, in admixture, 100 parts of vinyl resin selected from the group consisting of polyvinyl chloride and co-polymers of vinyl chloride and vinyl acetate containing at least about 95% of vinyl chloride in copolymerized form, from about 5 to 40 parts of unbleached clay, from about 2 to 10 parts of lead stabilizer, and from about 3 to 40 parts of at least one member selected from the group consisting of epoxidized fatty acids having from about 8 to 22 carbon atoms therein including the epoxy group

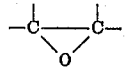

and esters of said epoxidized fatty acids with an acid esterifying compound selected from the group consisting of aliphatic alcohols, cycloaliphatic alcohols, aryl hydroxides and aralkyl alcohols.

2. A composition in accordance with claim 1, wherein said member is epoxidized soybean oil.

3. A composition in accordance with claim 2, wherein polyvinyl chloride is the vinyl resin.

4. A composition in accordance with claim 3, wherein dibasic lead phthalate is the lead stabilizer.

5. A composition in accordance with claim 3, wherein dibasic lead phosphite is the lead stabilizer.

6. A composition suitable for use as electrical insulation material, said composition comprising, in admixture, vinyl resin selected from the group consisting of polyvinyl chloride and co-polymers of vinyl chloride and vinyl acetate containing at least about 95% of vinyl chloride in copolymerized form, unbleached clay, lead stabilizer, plasticizer and at least one member selected from the group consisting of epoxidized fatty acids having from about 8 to 22 carbon atoms therein including the epoxy group

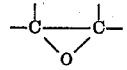

and esters of said epoxidized fatty acids with an acid esterifying compound selected from the group consisting of aliphatic alcohols, cycloaliphatic alcohols, aryl hydroxides and aralkyl alcohols, the proportion of said components being 100 parts of vinyl resin, from 5 to 40 parts of unbleached clay, from about 2 to 10 parts of a lead stabilizer, from about 3 to 40 parts of said member, the total weight of said plasticizer and said member being between about 25 to about 100 parts per 100 parts of said vinyl resin.

7. A composition in accordance with claim 6, wherein the plasticizer employed is an aliphatic linear polyester plasticizer.

8. A composition suitable for use as electrical insulation material, said composition comprising, in admixture, about 100 parts of polyvinyl chloride, about 21.4 parts of a polyester plasticizer having a molecular weight of about 2000, specific gravity of about 1.084 (20° C.), refractive index of 1.470 (20° C.) and viscosity of 3000 cps. (20° C.), about 10.7 parts of n-octyl n-decyl phthalate, about 10.7 parts of epoxidized soybean oil, about 5.4 parts of dibasic lead phthalate, about 0.45 part of dibasic lead stearate, and about 9.1 parts of unbleached clay, said composition being light in color and non-staining in contact with copper.

9. A composition suitable for use as electrical insulation material, said composition comprising, in admixture, about 100 parts of polyvinyl chloride resin, about 43.7 parts of propylene glycol sebacate polyester plasticizer, about 17.6 parts of epoxidized soybean oil, about 5.3 parts of dibasic lead phosphite, about 0.44 part of dibasic lead stearate, and about 8.8 parts of unbleached clay, said composition being light in color and non-staining in contact with copper.

References Cited in the file of this patent

UNITED STATES PATENTS

| | | |
|---|---|---|
| 2,559,177 | Terry et al. | July 3, 1951 |
| 2,625,521 | Fischer | Jan. 13, 1953 |
| 2,671,064 | Cowell et al. | Mar. 2, 1954 |
| 2,723,962 | Hedges et al. | Nov. 15, 1955 |

OTHER REFERENCES

Lally et al.: "Stabilization of Polyvinyl Chloride," Modern Plastics, vol. 27, Issue 4, pages 111–112, 114, 116, 156–162 (Dec. 1949).

Hendricks: "Stabilization of Vinyl Plastics Containing Chloroparaffins," Ind. and Eng. Chem., pages 899–903, vol. 42, No. 5, May 1950.

UNITED STATES PATENT OFFICE
CERTIFICATE OF CORRECTION

Patent No. 2,912,397                            November 10, 1959

Vladimir J. Houska et al.

It is hereby certified that error appears in the above numbered patent requiring correction and that the said Letters Patent should read as corrected below.

In the grant, lines 1 and 2, for "Vladimir J. Houska, of Bound Brook, and Robert J. Lurie, of Plainfield, New Jersey," read -- Vladimir J. Houska, of Bound Brook, and Robert J. Lurie, of Plainfield, New Jersey, assignors to Union Carbide Corporation, a corporation of New York, --; line 11, for "Vladimir J. Houska and Robert J. Lurie, their heirs" read -- Union Carbide Corporation, its successors --; in the heading to the printed specification, lines 4 and 5, for "Vladimir J. Houska, Bound Brook, and Robert J. Lurie, Plainfield, N. J." read -- Vladimir J. Houska, Bound Brook, and Robert J. Lurie, Plainfield, N. J., assignors to Union Carbide Corporation, a corporation of New York --; in the printed specification, column 3, line 9, after "esters" insert -- are characterized by the presence of the epoxy group

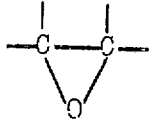

and --; lines 11 and 12, for "Their preparation and isolation" read -- The esters contain the epoxy group in the fatty acid moiety of the esters. The preparation and isolation of the epoxidized fatty acids and esters employed according to the invention --; column 4, lines 1, 2, and 3, for "epoxidized esters having alcohol groups derived from aromatic alcohols such as phenol;" read -- the esters in which the acid esterifying group is derived from an aryl hydroxide such as phenol; --.

Signed and sealed this 7th day of June 1960.

(SEAL)
Attest:

KARL H. AXLINE                                       ROBERT C. WATSON
Attesting Officer                                  Commissioner of Patents